United States Patent
Shen et al.

(10) Patent No.: US 12,088,714 B2
(45) Date of Patent: Sep. 10, 2024

(54) IMAGE ACQUISITION APPARATUS, SERVER, AND ENCRYPTION AND DECRYPTION METHODS

(71) Applicant: CHINA UNIONPAY CO., LTD., Shanghai (CN)

(72) Inventors: Xi Shen, Shanghai (CN); Jialiang Kang, Shanghai (CN); Jien Zhou, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 351 days.

(21) Appl. No.: 17/619,193

(22) PCT Filed: Jul. 10, 2020

(86) PCT No.: PCT/CN2020/101240
§ 371 (c)(1),
(2) Date: Dec. 14, 2021

(87) PCT Pub. No.: WO2021/004520
PCT Pub. Date: Jan. 14, 2021

(65) Prior Publication Data
US 2022/0360440 A1    Nov. 10, 2022

(30) Foreign Application Priority Data
Jul. 11, 2019    (CN) .......................... 201910624184.1

(51) Int. Cl.
*H04L 9/14* (2006.01)
*G06V 10/10* (2022.01)
*H04L 9/32* (2006.01)

(52) U.S. Cl.
CPC .............. *H04L 9/14* (2013.01); *G06V 10/10* (2022.01); *H04L 9/3231* (2013.01); *H04L 9/3239* (2013.01); *H04L 9/3247* (2013.01)

(58) Field of Classification Search
CPC ....... H04L 9/14; H04L 9/3231; H04L 9/3239; H04L 9/3247; G06V 10/10
See application file for complete search history.

(56) References Cited

U.S. PATENT DOCUMENTS 10,491,401 B2 * 11/2019 Schilder ................ H04L 9/3242
11,405,189 B1 *  8/2022 Bennison ............ H04L 63/0876
(Continued)

FOREIGN PATENT DOCUMENTS

| CA | 3004880 C | * 10/2023 | ............. G06F 21/32 |
| CN | 104809490 |   7/2015  | |

(Continued)

OTHER PUBLICATIONS

First Office Action issued on Feb. 2, 2021 for Chinese patent application No. 201910624184.1.
(Continued)

*Primary Examiner* — Pinalben Patel
(74) *Attorney, Agent, or Firm* — K&L Gates LLP

(57) ABSTRACT

The application provides an image acquisition apparatus, a server, and encryption and decryption methods, and relates to the field of data processing. The image acquisition apparatus includes: an image acquisition device including an encryption processor and a data interface provided in the image acquisition device, wherein the encryption processor is configured to encrypt, by using a stored first key, image data acquired by the image acquisition device to obtain image ciphertext data; the data interface is configured to obtain the image ciphertext data and output the image ciphertext data to a terminal device. With the technical solution of the application, security of the image data can be ensured.

12 Claims, 5 Drawing Sheets

(56) References Cited

U.S. PATENT DOCUMENTS

| | | | | |
|---|---|---|---|---|
| 2006/0184788 A1* | 8/2006 | Sandhu | ............... | H04L 9/3247 |
| | | | | 713/159 |
| 2011/0055585 A1* | 3/2011 | Lee | ............... | H04L 9/3226 |
| | | | | 713/183 |
| 2011/0093717 A1* | 4/2011 | Iwao | ............... | H04L 9/3247 |
| | | | | 713/179 |
| 2016/0012217 A1 | 1/2016 | Wolf et al. | | |
| 2017/0091550 A1 | 3/2017 | Feng et al. | | |
| 2018/0189476 A1* | 7/2018 | Li | ............... | H04L 9/3231 |
| 2020/0145408 A1* | 5/2020 | Komperla | ............... | H04L 9/3231 |

FOREIGN PATENT DOCUMENTS

| | | |
|---|---|---|
| CN | 104951704 | 9/2015 |
| CN | 105227316 | 1/2016 |
| CN | 105373924 | 3/2016 |
| CN | 105897428 | 8/2016 |
| CN | 105933280 | 9/2016 |
| CN | 106452746 A | 2/2017 |
| CN | 107506635 A | 12/2017 |
| CN | 107733636 | 2/2018 |
| CN | 108270798 A | 7/2018 |
| CN | 108319830 | 7/2018 |
| CN | 108510278 | 9/2018 |
| CN | 108599946 | 9/2018 |
| CN | 108833431 | 11/2018 |
| CN | 109101803 | 12/2018 |
| CN | 109474419 A | 3/2019 |
| CN | 109922047 A | 6/2019 |
| CN | 110460580 | 11/2019 |
| JP | 2015504492 A | 2/2015 |
| JP | 2015512581 A | 4/2015 |

OTHER PUBLICATIONS

Second Office Action issued on Jun. 24, 2021 for Chinese patent application No. 201910624184.1.

International Search Report and Written Opinion issued on Sep. 28, 2020 for International PCT application No. PCT/CN2020/101240.

Notification of Grant dated Jan. 10, 2022 issued for Chinese Patent Application No. 201910624184.1.

Japanese Office Action dated Oct. 31, 2022 issued for Japanese Patent Application No. 2021-562967.

* cited by examiner

IMAGE ACQUISITION APPARATUS, SERVER, AND ENCRYPTION AND DECRYPTION METHODS

CROSS REFERENCE TO RELATED APPLICATION

The present application is a National Stage of International Application No. PCT/CN2020/101240, filed on Jul. 10, 2020, which claims the priority of Chinese Patent Application No. 201910624184.1 filed on Jul. 11, 2019, entitled "IMAGE ACQUISITION APPARATUS, SERVER, AND ENCRYPTION AND DECRYPTION METHODS". Both of the applications are incorporated herein by reference in their entireties.

TECHNICAL FIELD

The present application relates to the technical field of data processing, in particular to an image acquisition apparatus, a server, and encryption and decryption methods.

BACKGROUND

Face recognition is a biometric identification technology based on human facial feature information for identity recognition. Nowadays, with rapid development of face recognition technology, face recognition is increasingly used in various scenarios, such as transaction scenarios.

Human facial feature information is unique and not easy to be duplicated, which makes face recognition have a great advantage in accuracy. Due to the above characteristics of facial feature information, security of face data (that is, data of human facial feature information) is more important. In order to ensure the security of face data, a recognition terminal includes an encryption module. The encryption module can encrypt the face data transmitted from an image acquisition apparatus, and upload the encrypted face data for face recognition. However, the face data may be tampered with or leaked in the image acquisition apparatus or during transmission from the image acquisition apparatus to the recognition terminal, which reduces the security of the face data.

SUMMARY

Embodiments of the present application provide an image acquisition apparatus, a server, and encryption and decryption methods.

In a first aspect, the embodiments of the present application provide an image acquisition apparatus, including: an image acquisition device including an encryption processor and a data interface provided in the image acquisition device, wherein the encryption processor is configured to encrypt, by using a stored first key, image data acquired by the image acquisition device to obtain image ciphertext data; the data interface is configured to obtain the image ciphertext data and output the image ciphertext data to a terminal device.

In a second aspect, the embodiments of the present application provide a server, including a receiving module configured to receive image ciphertext data transmitted from a terminal device, the image ciphertext data being obtained by an encryption processor encrypting image data by using a stored first key, the image data being acquired by an image acquisition device in an image acquisition apparatus, the encryption processor being provided in the image acquisition device; a decryption module configured to decrypt the image ciphertext data by using the stored first key.

In a third aspect, the embodiments of the present application provide a data encryption method for the image acquisition apparatus in the above aspects. The data encryption method includes: acquiring the image data; encrypting the acquired image data by using the stored first key to obtain the image ciphertext data; outputting the image ciphertext data to the terminal device.

In a fourth aspect, the embodiments of the present application provide a data decryption method applied to the server in the above aspects. The data decryption method includes: receiving the image ciphertext data transmitted from the terminal device, the image ciphertext data being obtained by the encryption processor encrypting the image data by using the stored first key, the image data being acquired by the image acquisition device in the image acquisition apparatus, the encryption processor being provided in the image acquisition device; decrypting the image ciphertext data by using the stored first key.

encryption processor data interface image acquisition device encryption processor data interface

BRIEF DESCRIPTION OF THE DRAWINGS

The present application can be better understood from the following description of the specific implementations of the present application in conjunction with the accompanying drawings. In the drawings, the same or similar reference signs indicate the same or similar features.

DETAILED DESCRIPTION

Figure 1:
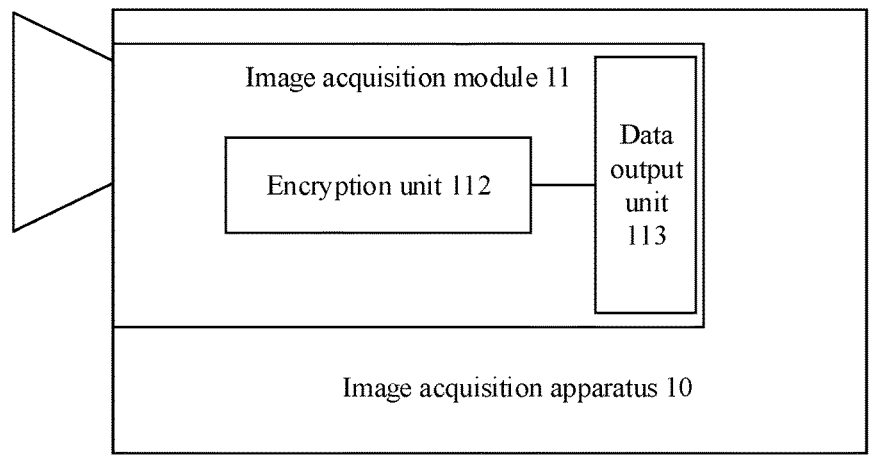
FIG. 1 is a schematic structural diagram of an image acquisition apparatus provided by an embodiment of the present application.

Features and exemplary embodiments of various aspects of the present application will be described in detail below. In the following detailed description, many specific details are proposed in order to provide a comprehensive understanding of the present application. However, it is obvious to those skilled in the art that the present application can be implemented without some of these specific details. The following description of the embodiments is only to provide a better understanding of the present application by showing examples of the present application. The present application is by no means limited to any specific configurations and algorithms proposed below, but covers any modification, replacement and improvement of elements, components and algorithms without departing from the spirit of the present application. In the drawings and the following description, well-known structures and technologies are not shown in order to avoid unnecessary obscurity of the application.

The embodiments of the present application provide an image acquisition apparatus, a server, and encryption and decryption methods, which can be applied to a scenario where an image is acquired and the image is recognized. For example, the scenario may include various business scenarios based on face recognition, specifically, including but not limited to transaction business, login business, attendance business (such as clocking in at work), and traffic business (such as passing through a gate).

The embodiments of the present application relate to a data secure transmission system, and the data secure transmission system may include an image acquisition apparatus, a terminal device, and a server.

The image acquisition apparatus may specifically be a camera or the like. The specific form of the camera is not limited, for example, including but not limited to an ordinary camera, a spherical camera, a gun camera or other cameras of specific physical forms. The camera can be in the form of a built-in all-in-one machine, or the camera can be connected to other devices through a mainboard (i.e. plug and play). The specific form and usage of the camera can be determined according to actual application scenarios.

The terminal device may be a smart terminal installed with a face recognition application to provide a user with face recognition related business. The form of the terminal device is not limited. The terminal device may be a large-scale device such as a vending machine, or a small desktop self-service face scanning terminal such as a smart sale terminal (i.e. a POS terminal), a gate, a self-service cashier terminal and the like. The server can perform data verification and face recognition, and output the recognition result. The data secure transmission system and components therein will be described in detail below.

FIG. 1 is a schematic structural diagram of an image acquisition apparatus provided by an embodiment of the application. As shown in FIG. 1, the image acquisition apparatus 10 includes an image acquisition device 11. An encryption processor 112 and a data interface 113 are provided in the image acquisition device 11.

The image acquisition device 11 may specifically include a camera module, which can normally capture image information so as to acquire the image data. The image data may specifically be RGB image data, and the RGB image data is image data that adopts the RGB (i.e., red, green, and blue) color standard.

The encryption processor 112 is configured to use a stored first key to encrypt image data acquired by the image acquisition device 11 to obtain image ciphertext data.

The first key is stored in the encryption processor 112. In the encryption processor 112, a management mode for each key (including the first key) is not limited. The key can be preset in the encryption processor 112 during a manufacturing process, or the encryption processor 112 can be provided with a key update interface and the key can be updated with key protection.

The image ciphertext data is the image data encrypted with the first key. The encryption processor 112 may be specifically implemented as an encryption chip provided in the camera. An encryption algorithm for image data encryption is not limited here and can be a symmetric or asymmetric encryption algorithm. For example, the encryption algorithm may include but not limited to a Data Encryption Standard (DES) algorithm, a Triple Data Encryption Standard (3DES) algorithm, an Advanced Encryption Standard (AES) algorithm, a RSA algorithm (that is, an asymmetric encryption algorithm), a SM4 algorithm (that is, a standard block cipher algorithm), etc.

The data interface 113 is configured to obtain the image ciphertext data, and output the image ciphertext data to the terminal device.

In some examples, the data interface 113 includes a data output standard interface, and the data output standard interface can output various types of data.

In the embodiments of the present application, by providing the encryption processor 112 and the data interface 113 in the image acquisition device of the image acquisition apparatus 10, the acquired image data is encrypted by the encryption processor 112 and output to outside through the data interface 113. That is, after the image data is acquired, the image data is directly encrypted in the image acquisition device 11. The encrypted image data (i.e. the image ciphertext data) is transmitted outward. It is difficult to tamper with or steal the image ciphertext data, and thus the security of the image data can be ensured. Moreover, since the image data is encrypted in the image acquisition device 11, correspondingly, the terminal device that receives the image ciphertext data does not need to be provided with an encryption interface, thereby reducing difficulty of development and transformation of the terminal device.

In order to further ensure the security and accuracy of the decrypted image ciphertext data used for a recognition function in the server, security verification may be further performed on the decrypted image ciphertext data in the server.

In some embodiments, the above data interface 113 is further configured to output image verification auxiliary information obtained based on the image data to the terminal device.

The image verification auxiliary information is used to perform the security verification on the decrypted image ciphertext data. The security verification here is to verify whether the image ciphertext data transmitted from the image acquisition device 11 has been tampered with or whether there is an error. With the security verification, the accuracy of the transmitted image data is guaranteed. A successful security verification means that the image ciphertext data transmitted from the image acquisition device 11 is accurate. A failed security verification means that the image ciphertext data transmitted from the image acquisition device 11 is inaccurate. The server can determine whether to perform image recognition, such as face recognition, according to whether the security verification is successful.

In some examples, the image verification auxiliary information may include the image data.

In some other examples, the encryption processor 112 is further configured to calculate a digest of the image data according to a digest algorithm; obtain a signature of the digest of the image data as the image verification auxiliary information by using the stored second key. That is, the image verification auxiliary information includes the signature of the digest of the image data.

The digest algorithm is not limited. A MD5 Message-Digest Algorithm (MD5), a Secure Hash Algorithm (sha1), a sha256 algorithm (i.e., a hash value algorithm), a SM3 algorithm (i.e., a standard for cryptographic hash function) and the like can be used. The signature algorithm is also not limited.

In order to prevent someone from providing false image data using forgery means such as photos or videos, the above image acquisition device 11 is further configured to acquire live-body feature data corresponding to the image data, thereby further improving security and reliability of subsequent recognition functions.

Specifically, the image acquisition device 11 may include a live-body feature capturing module, which can acquire 3D live-body feature data of a live creature. The live-body feature capturing module may specifically be a 3D live-body detection module. The 3D live-body detection module may include, but not limited to, a structured light module, a Time of Flight (TOF) module, an infrared detection module, etc. The live-body feature data can be used for live-body detection so as to determine whether an object of the acquired image data is a live body of a living creature.

Correspondingly, in some examples, the above data interface 113 is specifically further configured to output live-body feature data acquired by the image acquisition device 11, and specifically, the live-body feature data may be transmitted to the terminal device for processing.

In some other examples, the encryption processor 112 is further configured to perform a live-body detection based on the live-body feature data to obtain live-body detection result data. Also, a signature of the live-body detection result data is obtained by using a stored third key.

The live-body detection result data can indicate whether an object of the acquired live-body feature data is a live body of a living creature. The encryption processor 112 stores the third key. In order to ensure the security of the live-body detection result data, the third key can be used to obtain the signature of the live-body detection result data. It is the signature of the live-body detection result data that is transmitted in the data secure transmission system (i.e. among the image acquisition apparatus 10, the terminal device and the server), so that it is possible to prevent the live-body detection result data from being tampered with, being leaked or the like. The signature algorithm is not limited here either.

The data interface 113 is further configured to output the live-body detection result data and the signature of the live-body detection result data to the terminal device.

The image acquisition apparatus 10 outputs the live-body detection result data and the signature of the live-body detection result data to the terminal device. The live-body detection result data and the signature of the live-body detection result data can be used for live-body detection security verification in the subsequent process.

In still other examples, the encryption processor 112 is further configured to perform the live-body detection based on the live-body feature data to obtain the live-body detection result data, calculate the digest of the image data, use the live-body detection result data and the digest of the image data as integrated data, and obtain an integrated signature of the integrated data as the image verification auxiliary information by using a stored fourth key.

The data interface 113 is further configured to output the live-body detection result data.

The live-body detection result data and the digest of the image data are regarded as the integrated data, and the integrated signature of the integrated data is calculated, so it is possible to further ensure the accuracy and reliability of the live-body detection security verification in the subsequent process, and prevent the live-body detection result data and the image data from being tampered with, leaked or the like during the transmission process.

Figure 2:
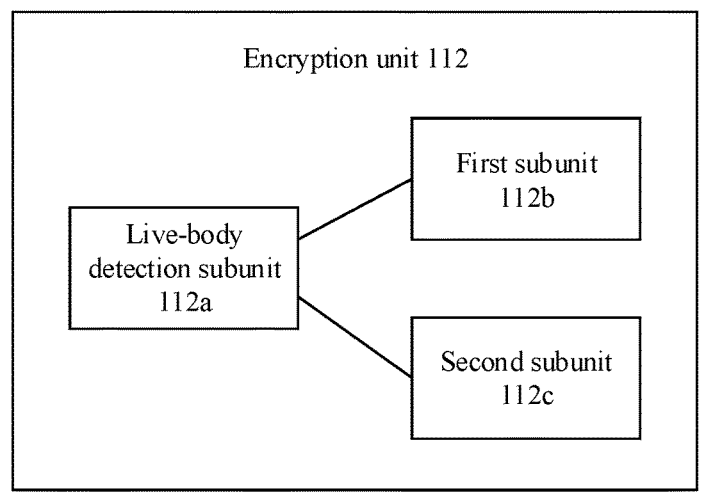
FIG. 2 is a schematic structural diagram of an encryption processor provided by an embodiment of the present application.

In the foregoing embodiments, if the live-body detection, the calculation of the signature of the live-body detection data or the like are performed in the encryption processor 112, the above encryption processor 112 may include a live-body detection subunit and an encryption subunit. The live-body detection sub-unit 112a may be configured to perform the live-body detection according to the live-body feature data to obtain the live-body detection result data. The encryption subunit may include a first subunit 112b for calculating the signature of the live-body detection result data and a second subunit 112c for encrypting the image data. For example, as shown in FIG. 2, FIG. 2 is a schematic structural diagram of an encryption processor provided by an embodiment of the application. It is worth mentioning that the structure of the encryption processor 112 includes but is not limited to the above structure.

It should be noted that whether the image acquisition apparatus 10 acquires the live-body feature data can be set according to specific work scenarios and work requirements. For example, in an application scenario where there is a person on duty and probability of fraud is low, the live-body feature data may not be acquired, that is, it is not necessary to add the function of acquiring the live-body feature data in the image acquisition device 11, so that the cost of the image acquisition apparatus 10 can be reduced.

Figure 3:
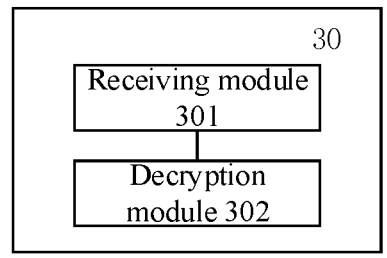
FIG. 3 is a schematic structural diagram of a server provided by an embodiment of the present application.

FIG. 3 is a schematic structural diagram of a server provided by an embodiment of the application. As shown in FIG. 3, the server 30 includes a receiving module 301 and a decryption module 302.

The receiving module 301 is configured to receive image ciphertext data transmitted from a terminal device.

The image ciphertext data is obtained by an encryption processor encrypting image data by using a stored first key. The image data is acquired by an image acquisition device in an image acquisition apparatus. The encryption processor is provided in the image acquisition device.

The decryption module 302 is configured to decrypt the image ciphertext data by using the stored first key.

The decrypted image ciphertext data can be used for a recognition function, such as face recognition.

The first key is only stored in the image acquisition apparatus 10 and the server 30, which makes the first key hard to be leaked. The image ciphertext data can only be decrypted by the server storing the first key, and neither the face recognition application nor any third party can decrypt the image ciphertext data. The security of image data transmission can be further improved, and the accuracy and security of recognition functions such as face recognition can also be improved.

For the technical effects of the server 30, reference can be made to the technical effects of the image acquisition apparatus 10 in the foregoing embodiments, and the details will not be repeated here.

Figure 4:
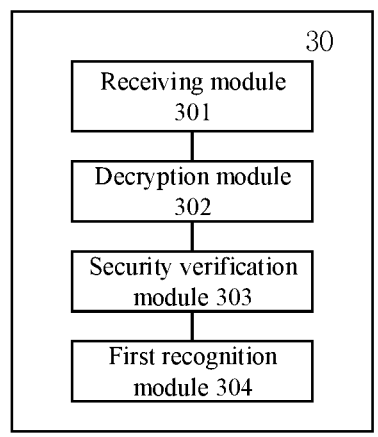
FIG. 4 is a schematic structural diagram of a server provided by another embodiment of the present application.

FIG. 4 is a schematic structural diagram of a server provided by another embodiment of the application. The difference between FIG. 4 and FIG. 3 is that the server 30 shown in FIG. 4 may further include a security verification module 303 and a first recognition module 304.

The security verification module 303 is configured to receive image verification information transmitted from the terminal device and perform security verification on the decrypted image ciphertext data by using the image verification information.

The image verification information is obtained by the terminal device according to image verification auxiliary information output by the image acquisition apparatus.

In some examples, the image verification auxiliary information includes the image data. The image verification information includes a signature of a digest of the image data obtained by the terminal device using a fifth key.

The security verification module 303 is specifically configured to calculate a digest of the decrypted image ciphertext data, match the digest of the decrypted image ciphertext data with the image verification information based on the stored fifth key, and determine that the security verification is successful under a condition that the digest of the decrypted image ciphertext data matches the image verification information.

Both the terminal device and the server 30 store the fifth key.

Specifically, the fifth key can be used to obtain the signature of the digest of the decrypted image ciphertext data. The signature of the digest of the decrypted image ciphertext data is compared with the signature of the digest of the image data in the image verification information. If the signature of the digest of the decrypted image ciphertext data is consistent with the signature of the digest of the image data in the image verification information, it is considered that the digest of the decrypted image ciphertext data matches the image verification information. If the signature of the digest of the decrypted image ciphertext data is inconsistent with the signature of the digest of the image data in the image verification information, it is considered that the digest of the decrypted image ciphertext data does not match the image verification information.

Alternatively, the fifth key can be used to obtain the digest of the image data corresponding to the image verification information according to the signature of the digest of the image data in the image verification information. The digest of the image data corresponding to the image verification information is compared with the digest of the decrypted image ciphertext data. If the digest of the image data corresponding to the image verification information is consistent with the digest of the decrypted image ciphertext data, it is considered that the digest of the decrypted image ciphertext data matches the image verification information. If the digest of the image data corresponding to the image verification information is inconsistent with the digest of the decrypted image ciphertext data, it is considered that the digest of the decrypted image ciphertext data does not match the image verification information.

In some other examples, the image verification auxiliary information includes a signature of a digest of the image data obtained using a second key. The image verification information includes a signature of a digest of the image data obtained by the image acquisition apparatus using the second key.

The security verification module 303 is specifically configured to calculate a digest of the decrypted image ciphertext data, match the digest of the decrypted image ciphertext data with the image verification information based on the stored second key, and determine that the security verification is successful under a condition that the digest of the decrypted image ciphertext data matches the image verification information.

Both the image acquisition apparatus 10 and the server 30 store the second key.

For the process of matching the digest of the decrypted image ciphertext data with the image verification information, reference may be made to the process of matching the digest of the decrypted image ciphertext data with the image verification information in the above examples, and the details will not be repeated here.

In still other examples, the image verification auxiliary information includes an integrated signature of integrated data obtained by the image acquisition apparatus using a fourth key. The integrated data includes a digest of the image data and live-body detection result data. The image verification information includes the integrated signature of the integrated data.

The receiving module 301 is further configured to receive transmitted live-body detection result data.

The security verification module 303 is specifically configured to calculate a digest of the decrypted image ciphertext data, match the digest of the decrypted image ciphertext data with the image verification information and match the live-body detection result data with the image verification information based on the stored fourth key, determine that the security verification is successful under a condition that the digest of the decrypted image ciphertext data matches the image verification information, and determine that live-body detection security verification is successful under a condition that the live-body detection result data matches the image verification information.

Both the image acquisition apparatus 10 and the server 30 store the fourth key.

In the above embodiments, the success of security verification means that the image ciphertext data has not been tampered with and is accurate. The failure of security verification means that the image ciphertext data is inaccurate. Thus the security and reliability of the data transmitted in the data secure transmission system can be further ensured, and the security and reliability of the recognition function such as face recognition in the subsequent process can be improved.

The first recognition module 304 is configured to perform, under a condition that the security verification is successful, user recognition based on the decrypted image ciphertext data and user identity information acquired and provided by the terminal device to obtain a recognition result, and send the recognition result to the terminal device, to enable the terminal device to process business corresponding to the image data according to the recognition result.

If the security verification fails, the server 30 will not perform the user recognition. Thus the security and reliability of the recognition function such as face recognition can be ensured.

Figure 5:
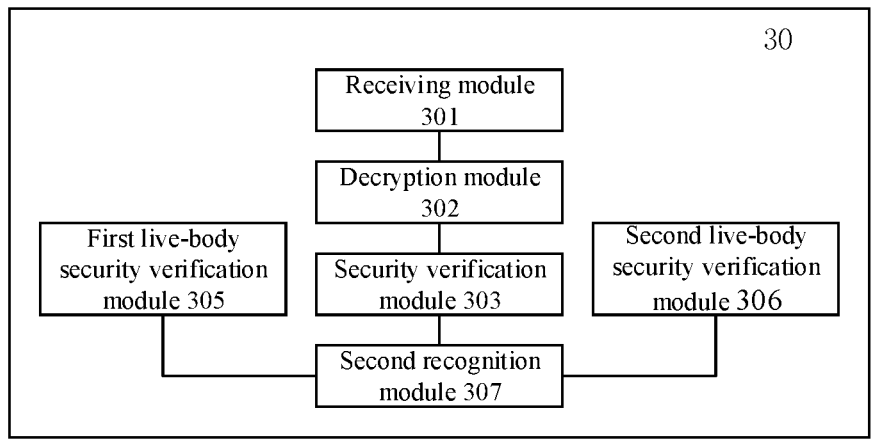
FIG. 5 is a schematic structural diagram of a server provided by a further embodiment of the present application.

FIG. 5 is a schematic structural diagram of a server provided by another embodiment of the application. The difference between FIG. 5 and FIG. 3 is that the server shown in FIG. 5 may further include a security verification module 303, the server may further include a first live-body security verification module 305 and/or a second live-body security verification module 306, and the server 30 may further include a second recognition module 307.

For the description content of the security verification module 303, reference may be made to the relevant description in the above embodiments, and the details will not be repeated here.

The first live-body security verification module 305 is configured to match a transmitted signature of live-body detection result data with the live-body detection result data based on a stored sixth key, and determine that live-body detection security verification is successful under a condition that the transmitted signature of the live-body detection result data matches the live-body detection result data.

The live-body detection result data is obtained by the terminal device performing a live-body detection according to live-body feature data output by the image acquisition apparatus. The signature of the live-body detection result data is obtained by the terminal device using the stored sixth key according to the live-body detection result data. Both the terminal device 20 and the server 30 store the sixth key.

Specifically, the transmitted live-body detection result data may be processed based on the sixth key to obtain the signature of the live-body detection result data. The obtained signature of the live-body detection result data is compared with the transmitted signature of the live-body detection result data. If the obtained signature of the live-body detection result data is consistent with the transmitted signature of the live-body detection result data, it is considered that the transmitted signature of the live-body detection result data matches the live-body detection result data. If the obtained signature of the live-body detection result data is inconsistent with the transmitted signature of the live-body detection result data, it is considered that the transmitted signature of the live-body detection result data does not match the live-body detection result data.

Alternatively, the transmitted signature of the live-body detection result data may be processed based on the sixth key to obtain the live-body detection result data. The obtained live-body detection result data is compared with the transmitted live-body detection result data. If the obtained live-body detection result data is consistent with the transmitted live-body detection result data, it is considered that the transmitted signature of the live-body detection result data matches the live-body detection result data. If the obtained live-body detection result data is inconsistent with the transmitted live-body detection result data, it is considered that the transmitted signature of the live-body detection result data does not match the live-body detection result data.

In this example, live-body detection security verification can be performed, thereby further ensuring the security and reliability of the data transmitted in the data secure transmission system, and improving the security and reliability of the recognition function such as face recognition in the subsequent process.

The second live-body security verification module 306 is configured to match a transmitted signature of live-body detection result data with the live-body detection result data based on a stored third key, and determine that live-body detection security verification is successful under a condition that the transmitted signature of the live-body detection result data matches the live-body detection result data.

The live-body detection result data is obtained by the image acquisition apparatus performing a live-body detection according to acquired live-body feature data. The signature of the live-body detection result data is obtained by the image acquisition apparatus using the stored third key according to the live-body detection result data.

Both the image acquisition apparatus 10 and the server 30 store the third key. For matching of the transmitted signature of the live-body detection result data and the live-body detection result data, reference may be made to the relevant content in the foregoing embodiments, and the details will not be repeated here.

In the embodiments of the application, the live-body detection security verification can be performed so as to further ensure the security and reliability of the data transmitted in the data secure transmission system and further improve the security and reliability of the recognition function such as face recognition in the subsequent process.

In the embodiments of the application, the double verification including the security verification and the live-body detection security verification can be performed so as to further ensure the security and reliability of the data transmitted in the data secure transmission system and further improve the security and reliability of the recognition function such as face recognition in the subsequent process.

In the above embodiments, the success of the live-body detection security verification means that the live-body detection result data has not been tampered with and is accurate. The failure of the live-body detection security verification means that the live-body detection result data is inaccurate.

The second recognition module 307 is configured to perform, under a condition that the security verification is successful and live-body detection security verification is successful, user recognition based on the decrypted image ciphertext data and user identity information acquired and provided by the terminal device to obtain a recognition result, and send the recognition result to the terminal device, to enable the terminal device to process business corresponding to the image data according to the recognition result.

If at least one of the security verification and the live-body detection security verification fails, the server 30 will not perform the user recognition. Thus the security and reliability of the recognition function such as face recognition can be ensured.

The first key to the sixth key in the foregoing embodiments may be the same key or different keys, which is not limited herein.

In order to be able to describe the entire data transmission process and the recognition process more completely, the data secure transmission system in the embodiments of the application will be described below.

Figure 6:
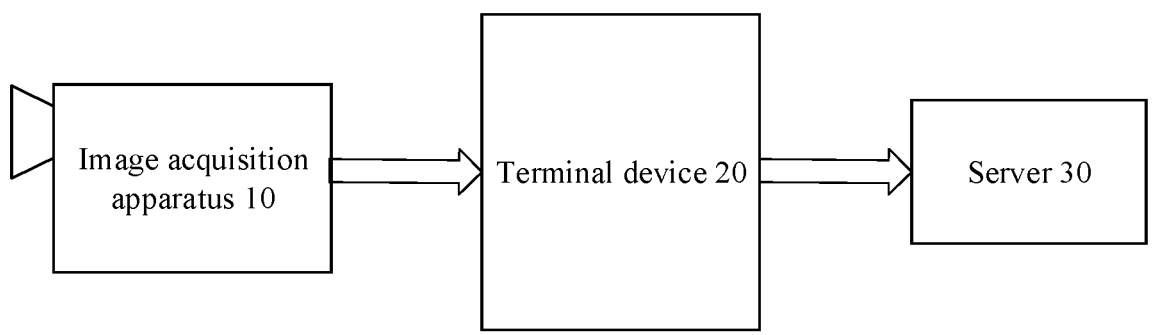
FIG. 6 is a schematic structural diagram of a data secure transmission system provided by an embodiment of the present application.

FIG. 6 is a schematic structural diagram of a data secure transmission system provided by an embodiment of the application. As shown in FIG. 6, the data secure transmission system includes the image acquisition apparatus 10, the terminal device 20, and the server 30 in the above embodiments.

For the relevant description of the image acquisition apparatus 10, reference may be made to the above relevant content, and the details will not be repeated here.

For the relevant description of the server 30, reference may be made to the above relevant content, and the details will not be repeated here.

The terminal device 20 is configured to receive the image ciphertext data output by the image acquisition apparatus 10 and transmit the image ciphertext data to the server 30. A recognition application can be installed in the terminal device 20 to receive a recognition request so as to drive the image acquisition apparatus 10, and business corresponding to acquisition of the image data can be performed according to the recognition result of the server 30.

For the technical effects of the data secure transmission system, reference can be made to the technical effects of the image acquisition apparatus 10 in the above embodiments, and the details will not be repeated here.

The terminal device 20 is further configured to acquire user identity information and output the user identity information to the server 30. Specifically, the user identity information may include the user's mobile phone number, certain digits of the user's mobile phone number, the user's account or the like, which is not limited here.

The server 30 may perform user recognition according to the user identity information and the decrypted image ciphertext data to obtain a recognition result, and send the recognition result to the terminal device 20.

The terminal device 20 may receive the recognition result, and process the business corresponding to the acquisition of the image data according to the recognition result, such as transaction business, login business, attendance business, traffic business or the like.

The terminal device 20 can also implement a recognition related task, such as displaying an image corresponding to the image data, tracking a recognized object of the acquired image data, or the like.

In some examples, the image acquisition apparatus is further configured to transmit the image data to the terminal device.

The terminal device 20 is further configured to perform the recognition related task according to the image data output by the image acquisition apparatus 10. For example, the terminal device 20 displays an image interface corresponding to the image data according to the received image data, so as to provide the user with direct demonstration. For another example, the terminal device 20 performs image tracking on the recognized object according to the received image data.

In other examples, the first key may also be stored in the terminal device 20, and the terminal device 20 is further configured to decrypt the image ciphertext data output by the image acquisition apparatus 10 by using the stored first key, and perform the recognition related task according to the decrypted Image ciphertext data.

The decrypted image ciphertext data is the image data. For description of performing the recognition related task, reference may be made to the relevant content in the above examples, and the details will not be repeated here.

In some embodiments, the image acquisition apparatus 10 is further configured to output the image verification auxiliary information.

The terminal device 20 is further configured to obtain the image verification information according to the image verification auxiliary information output by the image acquisition apparatus 10 and transmit the image verification information to the server 30. The image verification information may be the same as or different from the image verification auxiliary information, which is not limited here.

The server 30 is further configured to perform security verification on the decrypted image ciphertext data by using the image verification information.

In some embodiments, the live-body detection is performed by the terminal device 20. Accordingly, the implementation of the image acquisition apparatus 10 will be relatively simple, thereby reducing the cost of the image acquisition apparatus 10.

Figure 7:
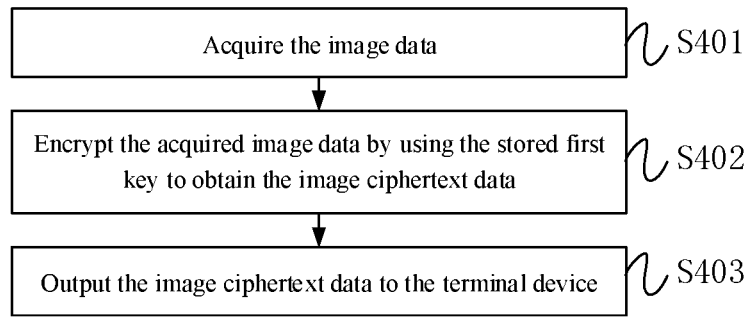
FIG. 7 is a flowchart of a data encryption method provided by an embodiment of the present application.

FIG. 7 is a flowchart of a data encryption method provided by an embodiment of the application. The data encryption method can be applied to the image acquisition apparatus in the above embodiments. As shown in FIG. 7, the data encryption method may include step S401 to step S403.

In step S401, image data is acquired.

In step S402, the acquired image data is encrypted by using a stored first key to obtain image ciphertext data.

In step S403, the image ciphertext data is output to a terminal device.

In the embodiment of the present application, by encrypting the acquired image data in the image acquisition device of the image acquisition apparatus and transmitting the encrypted image data (i.e. the image ciphertext data) outward, it is difficult to tamper with or steal the image ciphertext data that is already encrypted in the image acquisition apparatus, and thus the security of the image data can be ensured. Moreover, since the image data is encrypted in the image acquisition device of the image acquisition apparatus, the terminal device that receives the image ciphertext data does not need to be provided with an encryption interface, thereby reducing difficulty of development and transformation of the terminal device.

Figure 8:
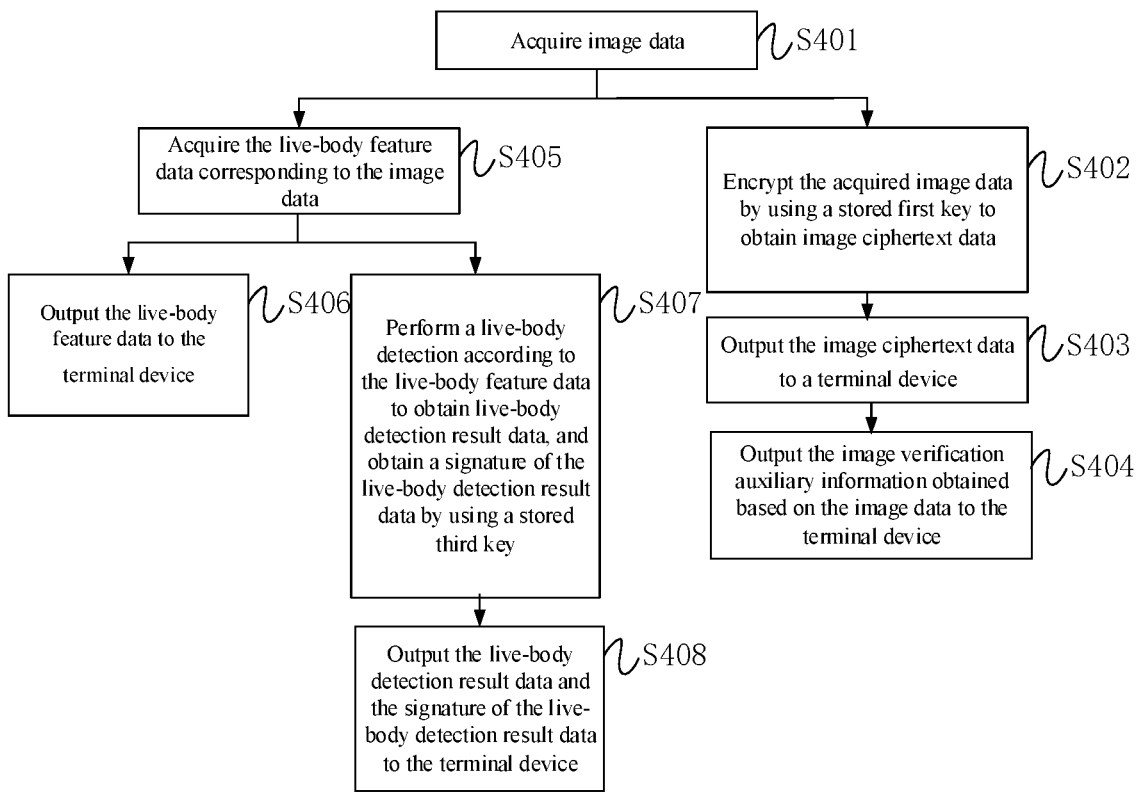
FIG. 8 is a flowchart of a data encryption method provided by another embodiment of the present application.

In some examples, FIG. 8 is a flowchart of a data encryption method provided by another embodiment of this application. In order to further ensure the security of the image ciphertext data output to other devices, such as the terminal device, the server or the like, and to ensure the security and reliability of the recognition function such as face recognition in the subsequent process, the data encryption method in the embodiment of the present application may further include step S404 to step S408 on the basis of FIG. 7.

In step S404, the image verification auxiliary information obtained based on the image data is output to the terminal device.

The image verification auxiliary information is used to perform security verification on the decrypted image ciphertext data.

In some examples, the image verification auxiliary information includes the image data.

In some other examples, the image verification auxiliary information includes a signature of a digest of the image data. Specifically, step S404 can be refined as: calculating the digest of the image data according to a digest algorithm; obtaining the signature of the digest of the image data as the image verification auxiliary information by using a stored second key.

In step S405, the live-body feature data corresponding to the image data is acquired.

In step S406, the live-body feature data is output to the terminal device.

In step S407, a live-body detection is performed according to the live-body feature data to obtain live-body detection result data, and a signature of the live-body detection result data is obtained by using a stored third key.

In step S408, the live-body detection result data and the signature of the live-body detection result data are output to the terminal device.

In still other examples, the live-body feature data is acquired, and the live-body detection is performed according to the live-body feature data to obtain the live-body detection result data. The image verification auxiliary information includes an integrated signature of integrated data. Specifically, step S404 can be refined as: using the live-body detection result data and the digest of the image data as the integrated data, and obtaining the integrated signature of the integrated data as the image verification auxiliary information by using a stored fourth key.

Figure 9:
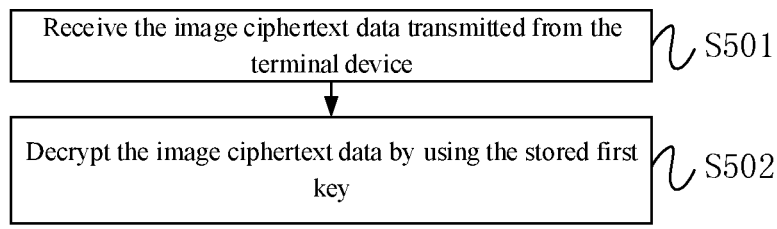
FIG. 9 is a flowchart of a data encryption method provided by an embodiment of the present application.

FIG. 9 is a flowchart of a data decryption method provided by an embodiment of the application. The data decryption method can be applied to the server in the above embodiments. The data decryption method may include step S501 and step S502.

In step S501, image ciphertext data transmitted from a terminal device is received.

The image ciphertext data is obtained by an encryption processor encrypting image data by using a stored first key. The image data is acquired by an image acquisition device in an image acquisition apparatus. The encryption processor is provided in the image acquisition device.

In step S502, the image ciphertext data is decrypted by using the stored first key.

For the technical effects of the data decryption method, reference can be made to the technical effects of the server in the foregoing embodiments, and details will not be repeated here.

In order to further ensure the security of the image ciphertext data transmitted to the server, and to ensure the security and reliability of the recognition function such as face recognition in the subsequent process, on the basis of the data decryption method shown in FIG. 9, the data decryption method may further include step S503; the data decryption method may further include step S504 to step S505, or include step S506 to S507; the data decryption method may further include step S508 to step S509, or include step S510 to S511.

In step S503, image verification information transmitted from the terminal device is received, and security verification is performed on the decrypted image ciphertext data by using the image verification information.

The image verification information is obtained by the terminal device according to image verification auxiliary information output by the image acquisition apparatus.

In some examples, the image verification auxiliary information includes the image data. The image verification information includes a signature of a digest of the image data obtained by the terminal device using a fifth key.

The above step S503 can be refined as: calculating a digest of the decrypted image ciphertext data, matching the digest of the decrypted image ciphertext data with the image verification information based on the stored fifth key, and determining that the security verification is successful under a condition that the digest of the decrypted image ciphertext data matches the image verification information.

In some other examples, the image verification auxiliary information includes a signature of a digest of the image data obtained using a second key. The image verification information includes a signature of a digest of the image data obtained by the image acquisition apparatus using the second key.

The above step S503 can be refined as: calculating a digest of the decrypted image ciphertext data, matching the digest of the decrypted image ciphertext data with the image verification information based on the stored second key, and determining that the security verification is successful under a condition that the digest of the decrypted image ciphertext data matches the image verification information.

In step S504, a transmitted signature of live-body detection result data is matched with the live-body detection result data based on a stored sixth key.

In step S505, live-body detection security verification is determined to be successful under a condition that the transmitted signature of the live-body detection result data matches the live-body detection result data.

The live-body detection result data is obtained by the terminal device performing a live-body detection according to live-body feature data output by the image acquisition apparatus. The signature of the live-body detection result data is obtained by the terminal device using the stored sixth key according to the live-body detection result data.

In step S506, a transmitted signature of live-body detection result data is matched with the live-body detection result data based on a stored third key.

In step S507, live-body detection security verification is determined to be successful under a condition that the transmitted signature of the live-body detection result data matches the live-body detection result data.

The live-body detection result data is obtained by the image acquisition apparatus performing a live-body detection according to acquired live-body feature data. The signature of the live-body detection result data is obtained by the image acquisition apparatus using the stored third key according to the live-body detection result data.

In some examples, the image verification auxiliary information includes an integrated signature of integrated data obtained by the image acquisition apparatus using a fourth key. The integrated data includes a digest of the image data and live-body detection result data. The image verification information includes an integrated signature of the integrated data.

Specifically, the data decryption method may further include: receiving transmitted live-body detection result data; calculating a digest of the decrypted image ciphertext data, matching the digest of the decrypted image ciphertext data with the image verification information and matching the live-body detection result data with the image verification information based on the stored fourth key, determining that the security verification is successful under a condition that the digest of the decrypted image ciphertext data matches the image verification information, and determining that live-body detection security verification is successful under a condition that the live-body detection result data matches the image verification information.

In step S508, under a condition that the security verification is successful, user recognition is performed based on the decrypted image ciphertext data and user identity information acquired and provided by the terminal device, to obtain a recognition result.

In step S509, the recognition result is sent to the terminal device, to enable the terminal device to process business corresponding to the image data according to the recognition result.

In step S510, under a condition that the security verification is successful and live-body detection security verification is successful, user recognition is performed based on the decrypted image ciphertext data and user identity information acquired and provided by the terminal device, to obtain a recognition result.

In step S511, the recognition result is sent to the terminal device, to enable the terminal device to process business corresponding to the image data according to the recognition result.

Figure 10:
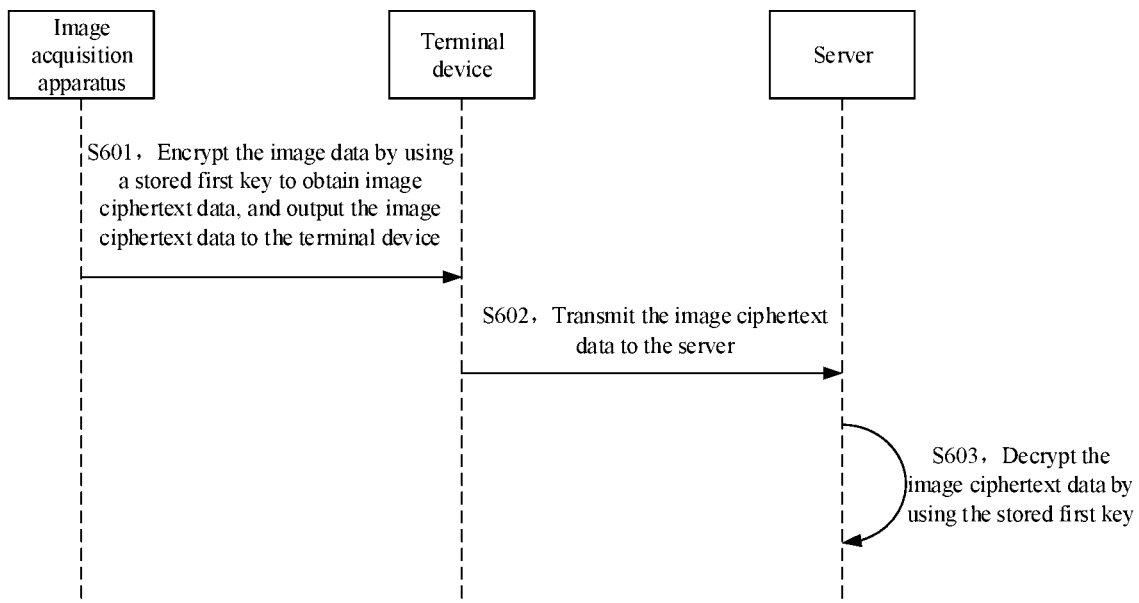
FIG. 10 is a flowchart of a data secure transmission method provided by an embodiment of the present application.

FIG. 10 is a flowchart of a data transmission provided by an embodiment of the application. The data secure transmission method can be applied to the data secure transmission system in the above embodiments. The data secure transmission method may include step S601 to step S603.

In step S601, the image acquisition apparatus acquires image data, encrypts the image data by using a stored first key to obtain image ciphertext data, and outputs the image ciphertext data to the terminal device.

In step S602, the terminal device receives the image ciphertext data, and transmits the image ciphertext data to the server.

In step S603, the server decrypts the image ciphertext data by using the stored first key.

For relevant description of the above steps, reference may be made to the relevant content in the above embodiments, and the details will not be repeated here. For the technical effects of the data secure transmission method in the embodiments of the present application, reference may be made to the technical effects of the data secure transmission system in the foregoing embodiments, and the details will not be repeated here.

In some examples, the above data secure transmission method further includes: the image acquisition apparatus transmits the image data to the terminal device; the terminal device further performs a recognition related task according to the image data output by the image acquisition apparatus.

In some other examples, the above data secure transmission method further includes: the terminal device uses the stored first key to decrypt the image ciphertext data output by the image acquisition apparatus, and performs a recognition related task based on the decrypted image ciphertext data.

In order to further ensure the security of transmission of the image ciphertext data to the server, and to ensure the security and reliability of the recognition function such as face recognition in the subsequent process, on the basis of the data secure transmission method shown in FIG. 10, the data secure transmission method may further include step S604 to step S606; the data secure transmission method may further include step S607 to step S610, or include step S611 to step S613.

In step S604, the image acquisition apparatus outputs image verification auxiliary information.

In step S605, the terminal device obtains image verification information according to the image verification auxiliary information output by the image acquisition apparatus, and transmits the image verification information to the server.

In step S606, the server performs security verification on decrypted image ciphertext data by using the image verification information.

In some examples, the image verification auxiliary information includes the image data.

Step S605 can be refined as: the terminal device calculates a digest of the image data in the image verification auxiliary information; obtains a signature of the digest of the image data in the image verification auxiliary information by using a stored fifth key; uses the signature of the digest of the image data as the image verification information for transmission to the server.

Step S606 can be refined as: the server calculates a digest of the decrypted image ciphertext data; matches the digest of the decrypted image ciphertext data with the image verification information based on the stored fifth key; determines that the security verification is successful under a condition that the digest of the image ciphertext data matches the image verification information.

In some other embodiments, the image verification auxiliary information includes a signature of the digest of the image data obtained by using a second key.

Step S605 can be refined as: the terminal device uses the signature of the digest of the image data obtained by using the second key as the image verification information for transmission to the server.

Step S606 can be refined as: the server calculates a digest of the decrypted image ciphertext data; matches the digest of the decrypted image ciphertext data with the image verification information based on the stored second key; determines that the security verification is successful under a condition that the digest of the image ciphertext data matches the image verification information.

The above data secure transmission method may further include: the terminal device acquires user identity information and outputs the user identity information to the server; under a condition that security verification is successful, the server performs user recognition based on the user identity information and the decrypted image ciphertext data to obtain recognition result, and sends the recognition result to the terminal device; the terminal device receives the recognition result sent by the server, and processes business corresponding to acquisition of the image data according to the recognition result.

In step S607, the image acquisition apparatus outputs live-body feature data.

In step S608, the terminal device performs a live-body detection according to the live-body feature data output by the image acquisition apparatus, and obtains live-body detection result data.

In step S609, the terminal device obtains a signature of the live-body detection result data by using a stored sixth key, and transmits the live-body detection result data and the signature of the live-body detection result data to the server.

In step S610, the server matches the transmitted signature of the live-body detection result data with the live-body detection result data based on the stored sixth key, and determines that live-body detection security verification is successful under a condition that the transmitted signature of the live-body detection result data matches the live-body detection result data.

In step S611, the image acquisition apparatus outputs the live-body detection result data and a signature of the live-body detection result data obtained by using a third key.

In step S612, the terminal device transmits, to the server, the live-body detection result data output by the image acquisition apparatus and the signature of the live-body detection result data obtained by using the third key.

In step S613, the server matches the transmitted signature of the live-body detection result data with the live-body detection result data based on the stored third key, and determines that live-body detection security verification is successful under a condition that the transmitted signature of the live-body detection result data matches the live-body detection result data.

The above data secure transmission method may further include: the terminal device acquires user identity information and outputs the user identity information to the server; under a condition that security verification is successful and live-body detection security verification is successful, the server performs user recognition based on the user identity information and the decrypted image ciphertext data to obtain recognition result, and sends the recognition result to the terminal device; the terminal device receives the recognition result sent by the server, and processes business corresponding to acquisition of the image data according to the recognition result.

In some examples, the image verification auxiliary information includes an integrated signature of integrated data obtained by using a fourth key, the integrated data includes a digest of the image data and the live-body detection result data, and the image verification information includes the integrated signature of the integrated data.

The image acquisition apparatus outputs the live-body detection result data. The terminal device transmits the live-body detection result data output by the image acquisition apparatus to the server.

The server calculates the digest of the decrypted image ciphertext data. The server matches the digest of the decrypted image ciphertext data with the image verification information and matches the live-body detection result data with the image verification information based on the stored fourth key. The server determines that the security verification is successful when the digest of the decrypted image ciphertext data matches the image verification information, and determines that the live-body detection security verification is successful when the live-body detection result data matches the image verification information.

For the relevant description of the above data secure transmission method, reference may be made to the relevant content in the data secure transmission system of the above embodiments, and the details will not be repeated here.

It should be clear that the various embodiments in this specification are described in a progressive manner, and the same or similar parts between the various embodiments can be referred to each other. The description of each embodiment focuses on the difference from other embodiments. For the server embodiments and the method embodiments, reference may be made to description parts of the embodiments of the image acquisition apparatus for relevant details. The application is not limited to the specific steps and structures described above and shown in the figures. Those skilled in the art may make various changes, modifications and additions, or change the order among steps after grasping the spirit of the application. Also, for the sake of conciseness, a detailed description of known methods and technologies is omitted here.

Various aspects of the present application are described above with reference to the flowcharts and/or block diagrams of the methods, apparatuses and systems according to the embodiments of the present application. It should be understood that each block in the flowcharts and/or block diagrams and combinations of blocks in the flowcharts and/or block diagrams may be implemented by programs or instructions. These programs or instructions may be provided to a processor of a general-purpose computer, a special-purpose computer, or other programmable data processing device to produce a machine that causes the execution of these programs or instructions via the processor of the computer or other programmable data processing device to enable implementation of the functions/actions specified in one or more blocks of the flowcharts and/or block diagrams. Such a processor may be, but not limited to, a general-purpose processor, a dedicated processor, a special application processor, or a field programmable logic circuit. It can also be understood that each block in the block diagrams and/or flowcharts and the combination of the blocks in the block diagrams and/or flowcharts may also be implemented by dedicated hardware that performs a specified function or action, or may be implemented by a combination of dedicated hardware and computer instructions.

Those skilled in the art should understand that the above embodiments are all exemplary rather than restrictive. Different technical features appearing in different embodiments may be combined to achieve beneficial effects. Those skilled in the art should be able to understand and implement other modified embodiments of the disclosed embodiments on the basis of studying the drawings, the description, and the claims. In the claims, the term "comprising" does not exclude other means or steps; the quantifier "a/an" does not exclude multiple; the terms "first" and "second" are used to denote names rather than to indicate any specific order. Any reference signs in the claims should not be construed as limiting the scope of protection. The functions of multiple parts appearing in the claims may be implemented by a single hardware or software module. Appearance of certain technical features in different dependent claims does not mean that these technical features cannot be combined to achieve beneficial effects.

What is claimed is:

1. An image acquisition apparatus, comprising:
    an image acquisition device comprising an encryption processor and a data interface provided in the image acquisition device, wherein
    the encryption processor is configured to encrypt, by using a stored first key, image data acquired by the image acquisition device to obtain image ciphertext data;
    the data interface is configured to obtain the image ciphertext data and output the image ciphertext data to a terminal device, wherein
    the image acquisition device is further configured to acquire live-body feature data corresponding to the image data;
    the encryption processor is further configured to perform a live-body detection based on the live-body feature data to obtain live-body detection result data;
    the data interface is further configured to output the live-body detection result data to the terminal device; and
    the encryption processor is further configured to calculate a digest of the image data, use the live-body detection result data and the digest of the image data as integrated data, and obtain an integrated signature of the integrated data as the image verification auxiliary information by using a stored fourth key, the image verification auxiliary information being used for security verification on decrypted image ciphertext data.

2. The image acquisition apparatus according to claim 1, wherein
    the data interface is further configured to output image verification auxiliary information obtained based on the image data to the terminal device.

3. The image acquisition apparatus according to claim 1, wherein
    the data interface is further configured to output the live-body feature data to the terminal device.

4. The image acquisition apparatus according to claim 1, wherein
    the encryption processor is further configured to obtain a signature of the live-body detection result data by using a stored third key;
    the data interface is further configured to output the signature of the live-body detection result data to the terminal device.

5. The image acquisition apparatus according to claim 1, wherein the image acquisition device comprises a camera module, or the image acquisition device comprises the camera module and a live-body feature capturing module.

6. A data encryption method for the image acquisition apparatus according to claim 1, the data encryption method comprising:
    acquiring the image data;
    encrypting the acquired image data by using the stored first key to obtain the image ciphertext data;
    outputting the image ciphertext data to the terminal device;
    acquiring live-body feature data corresponding to the image data;
    performing a live-body detection based on the live-body feature data to obtain live-body detection result data;
    outputting the live-body detection result data to the terminal device;
    calculating a digest of the image data, and using the live-body detection result data and the digest of the image data as integrated data; and
    obtaining an integrated signature of the integrated data as the image verification auxiliary information by using a stored fourth key, the image verification auxiliary information being used for security verification on decrypted image ciphertext data.

7. A server, comprising:
a receiving module configured to receive image ciphertext data transmitted from a terminal device, the image ciphertext data being obtained by an encryption processor encrypting image data by using a stored first key, the image data being acquired by an image acquisition device in an image acquisition apparatus, the encryption processor being provided in the image acquisition device;
a decryption module configured to decrypt the image ciphertext data by using the stored first key;
a security verification module configured to receive image verification information transmitted from the terminal device and perform security verification on the decrypted image ciphertext data by using the image verification information, the image verification information being obtained by the terminal device according to image verification auxiliary information output by the image acquisition apparatus;
wherein the image verification auxiliary information comprises an integrated signature of integrated data obtained by the image acquisition apparatus using a fourth key, the integrated data comprises a digest of the image data and live-body detection result data, and the image verification information comprises the integrated signature of the integrated data;
the receiving module is further configured to receive transmitted live-body detection result data;
the security verification module is specifically configured to calculate a digest of the decrypted image ciphertext data, match the digest of the decrypted image ciphertext data with the image verification information and match the live-body detection result data with the image verification information based on the stored fourth key, determine that the security verification is successful under a condition that the digest of the decrypted image ciphertext data matches the image verification information, and determine that live-body detection security verification is successful under a condition that the live-body detection result data matches the image verification information.

8. The server according to claim 7, further comprising:
a first live-body security verification module configured to match a transmitted signature of live-body detection result data with the live-body detection result data based on a stored sixth key, and determine that live-body detection security verification is successful under a condition that the transmitted signature of the live-body detection result data matches the live-body detection result data;
wherein the live-body detection result data is obtained by the terminal device performing a live-body detection according to live-body feature data output by the image acquisition apparatus, and the signature of the live-body detection result data is obtained by the terminal device using the stored sixth key according to the live-body detection result data.

9. The server according to claim 7, further comprising:
a second live-body security verification module configured to match a transmitted signature of live-body detection result data with the live-body detection result data based on a stored third key, and determine that live-body detection security verification is successful under a condition that the transmitted signature of the live-body detection result data matches the live-body detection result data;
wherein the live-body detection result data is obtained by the image acquisition apparatus performing a live-body detection according to acquired live-body feature data, and the signature of the live-body detection result data is obtained by the image acquisition apparatus using the stored third key according to the live-body detection result data.

10. The server according to claim 7, further comprising:
a first recognition module configured to perform, under a condition that the security verification is successful, user recognition based on the decrypted image ciphertext data and user identity information acquired and provided by the terminal device to obtain a recognition result, and send the recognition result to the terminal device, to enable the terminal device to process business corresponding to the image data according to the recognition result.

11. The server according to claim 7, further comprising:
a second recognition module configured to perform, under a condition that the security verification is successful and live-body detection security verification is successful, user recognition based on the decrypted image ciphertext data and user identity information acquired and provided by the terminal device to obtain a recognition result, and send the recognition result to the terminal device, to enable the terminal device to process business corresponding to the image data according to the recognition result.

12. A data decryption method applied to the server according to claim 7, the data decryption method comprising:
receiving the image ciphertext data transmitted from the terminal device, the image ciphertext data being obtained by the encryption processor encrypting the image data by using the stored first key, the image data being acquired by the image acquisition device in the image acquisition apparatus, the encryption processor being provided in the image acquisition device;
decrypting the image ciphertext data by using the stored first key;
receiving image verification information transmitted from the terminal device and performing security verification on the decrypted image ciphertext data by using the image verification information, wherein the image verification information is obtained by the terminal device according to image verification auxiliary information output by the image acquisition apparatus, the image verification auxiliary information comprises an integrated signature of integrated data obtained by the image acquisition apparatus using a fourth key, the integrated data comprises a digest of the image data and live-body detection result data, and the image verification information comprises the integrated signature of the integrated data;
receiving transmitted live-body detection result data;
calculating a digest of the decrypted image ciphertext data, matching the digest of the decrypted image ciphertext data with the image verification information and matching the live-body detection result data with the image verification information based on the stored fourth key, determining that the security verification is successful under a condition that the digest of the decrypted image ciphertext data matches the image verification information, and determining that live-body detection security verification is successful under a condition that the live-body detection result data matches the image verification information.

\* \* \* \* \*